United States Patent
Mentze et al.

(10) Patent No.: US 10,448,246 B2
(45) Date of Patent: Oct. 15, 2019

(54) NETWORK RE-CONVERGENCE POINT

(71) Applicant: HEWLETT PACKARD ENTERPRISE DEVELOPMENT LP, Houston, TX (US)

(72) Inventors: Duane Edward Mentze, Roseville, CA (US); Charles F. Clark, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 43 days.

(21) Appl. No.: 15/117,282

(22) PCT Filed: Apr. 29, 2014

(86) PCT No.: PCT/US2014/035898
§ 371 (c)(1),
(2) Date: Aug. 8, 2016

(87) PCT Pub. No.: WO2015/167462
PCT Pub. Date: Nov. 5, 2015

(65) Prior Publication Data
US 2017/0013452 A1    Jan. 12, 2017

(51) Int. Cl.
| | |
|---|---|
| *H04W 12/06* | (2009.01) |
| *H04L 9/32* | (2006.01) |
| *H04L 12/64* | (2006.01) |
| *H04L 29/06* | (2006.01) |
| *H04W 48/20* | (2009.01) |
| *H04W 72/06* | (2009.01) |

(52) U.S. Cl.
CPC .............. *H04W 12/06* (2013.01); *H04L 9/32* (2013.01); *H04L 12/6418* (2013.01); *H04L 63/08* (2013.01); *H04W 48/20* (2013.01); *H04W 72/06* (2013.01); *H04L 2209/80* (2013.01)

(58) Field of Classification Search
CPC .......... H04W 12/06; H04L 9/32; H04L 63/08; H04L 2209/80
See application file for complete search history.

(56) References Cited

U.S. PATENT DOCUMENTS 8,918,631 B1 * 12/2014 Kumar ................ H04L 12/4641 370/254
2003/0235175 A1 * 12/2003 Naghian ................ H04L 12/66 370/338

(Continued)

FOREIGN PATENT DOCUMENTS

WO    WO-2014/029870 A1    2/2014

OTHER PUBLICATIONS

International Search Report and Written Opinion, International Application No. PCT/US2014/035898, dated May 11, 2015, pp. 1-10.

(Continued)

*Primary Examiner* — Oleg Korsak
*Assistant Examiner* — Devin E Almeida
(74) *Attorney, Agent, or Firm* — Sheppard Mullin Richter & Hampton

(57) ABSTRACT

In an example, a re-convergence point is determined for a convergence point in a network. A host is currently connected to the convergence point for example to access the network. Authentication information and a policy for the host is sent to the re-convergence point prior to the host connecting to the re-convergence point to access the network.

19 Claims, 5 Drawing Sheets

(56) References Cited

U.S. PATENT DOCUMENTS

| | | | |
|---|---|---|---|
| 2005/0130658 A1 | 6/2005 | Stephens | |
| 2005/0195756 A1* | 9/2005 | Frattura | H04L 51/18 370/259 |
| 2006/0142004 A1* | 6/2006 | He | H04W 48/16 455/434 |
| 2008/0031194 A1* | 2/2008 | Yaqub | H04L 63/062 370/331 |
| 2008/0155094 A1* | 6/2008 | Roese | G01S 5/02 709/224 |
| 2010/0054179 A1 | 3/2010 | Meyer | |
| 2011/0164872 A1 | 7/2011 | Kumar et al. | |
| 2012/0075986 A1 | 3/2012 | Lu et al. | |
| 2012/0284773 A1* | 11/2012 | Gamer | H04L 9/083 726/3 |
| 2013/0265881 A1 | 10/2013 | Filsfils et al. | |
| 2013/0343180 A1 | 12/2013 | Kini et al. | |
| 2016/0029305 A1* | 1/2016 | Kim | H04W 24/02 370/311 |

OTHER PUBLICATIONS

Sachin Sharma et al., "Enabling Fast Failure Recovery in Openflow Networks," Jun. 30, 2011, pp. 1-8.

* cited by examiner

NETWORK RE-CONVERGENCE POINT

BACKGROUND

Networks facilitate the exchange of information between network clients. Hosts exchange information via the network by sending the information to an adjacent network infrastructure device, such as a router or access point, and the infrastructure device then forwards the information through the network to the receiving host. Infrastructure devices may also exchange information to aid in basic functions of the network, such as routing.

While many technologies have been devised to create networks, a very common mechanism is to use address based forwarding whereby information to be transmitted over the network is first prepended with forwarding based information such as source and destination addresses in a packet, and the addresses are used to forward the packet to the destination. To simplify the configuration of networks, the infrastructure devices support mechanisms to automatically learn the paths to forward information between clients. This is typically done in a distributed fashion, where each infrastructure device independently determines its own forwarding decisions based on addresses. An example of this is an Ethernet switch that supports media access control (MAC) address learning and forwarding which may include storing the MAC source address of a received packet and a port on which the packet is received. Then, if packets are received that are destined for the stored MAC address, they are forwarded on the corresponding port.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
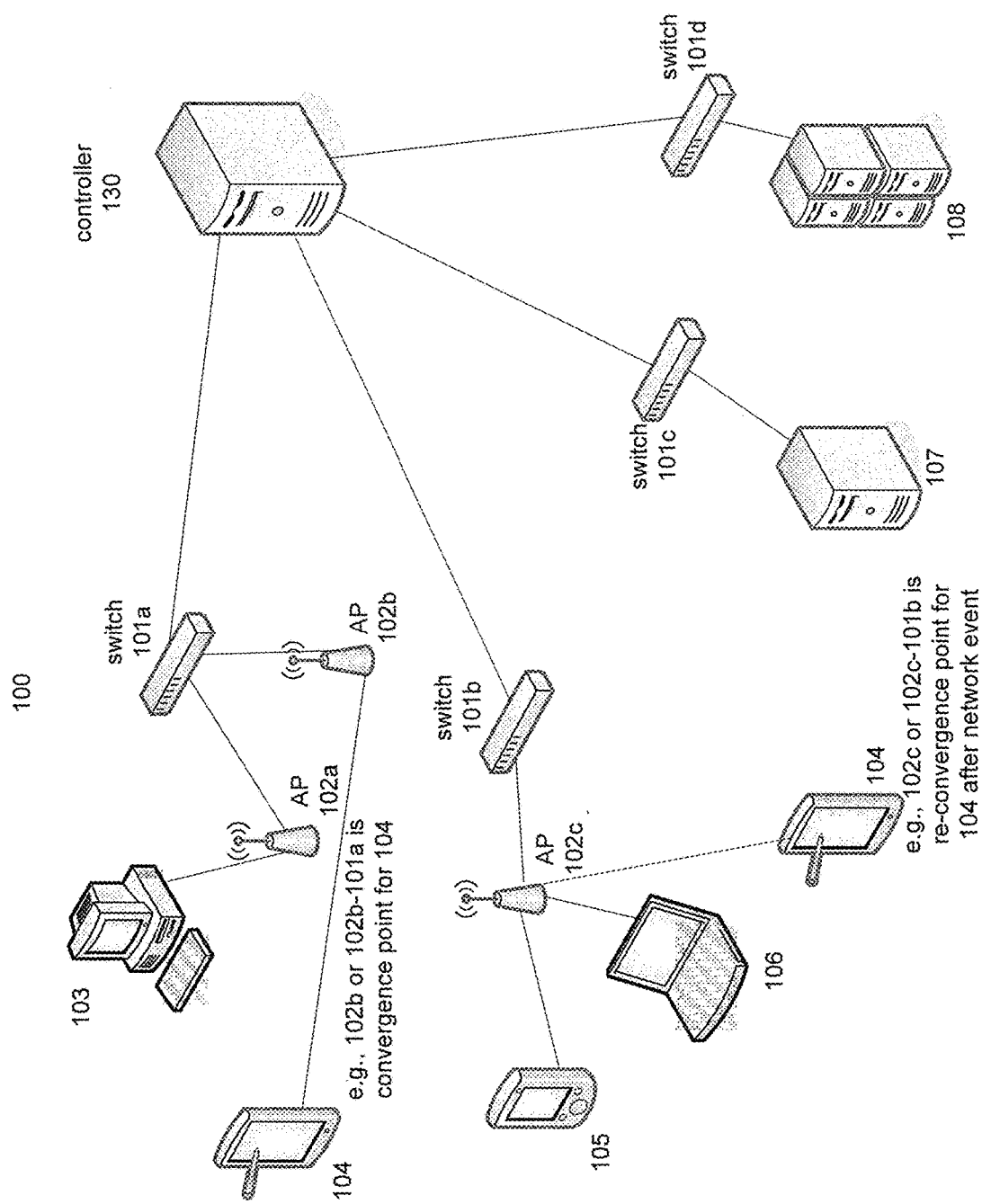
FIG. 1 shows a network, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

According to an example of the present disclosure, a network infrastructure device controller and network infrastructure devices facilitate accelerated authentication of hosts and implementation of network traffic policies for the hosts responsive to network events. Authentication information and policies for hosts are preemptively stored at re-convergence points associated with convergence points, which facilitates faster connection and policy implementation for the hosts if they reconnect to the network at a re-convergence point, for example, in response to a network event, such as a failure of network infrastructure device (e.g., an access point (AP) or switch) or in response to wireless roaming of the host. The methods and devices of the examples of the present disclosure can accelerate the convergence of forwarding decisions and associated traffic policies in order to facilitate improved network services and operation.

A convergence point is a network infrastructure device where a host can connect to the network. The convergence point for example is specific to a particular host and may be a network infrastructure device that the host is currently connected to for accessing a network, such as an ingress point for the network. Examples of a convergence point and network infrastructure device are a network switch or AP or any device that can connect a host to a network and/or forward network traffic for the host. A host is any device with a network interface, such as a laptop, desktop, mobile phone, tablet, server, etc.

According to an example, a convergence point is determined in the network, which may include a network infrastructure device to which the host is currently connected. Also, a re-convergence point is determined for the convergence point. The re-convergence point is also a network infrastructure device but the re-convergence point may be used to re-connect the host to the network if the host disconnects from the convergence point. According to an example, re-convergence points are located in close proximity or within one hop or a predetermined number of hops of their corresponding convergence points as is further described below. In an example, the host may be initially connected to the network through a convergence point. A network event happens, which may cause the host to disconnect from the convergence point, such as failure of the convergence point or the host is wirelessly roaming. The same host may subsequently try to connect to the network through the re-convergence point corresponding to the convergence point. The re-convergence point may be determined preemptively, such as prior to the host disconnecting from the convergence point or prior to the host attempting to connect to the re-convergence point, and authentication and policy information for the host may also be preemptively distributed to the re-convergence point to enable accelerated convergence of forwarding decisions and associated traffic policies for the host. Thus, when the host connects to the re-convergence point, the re-convergence point may authenticate the host with the authentication information and implement the policy for the host.

The devices and methods of the examples of the present disclosure can reduce or eliminate the need to reauthorize traffic when a host changes its ingress location. For example, instead of having to authenticate the host at the re-convergence point by exchanging messages between the re-convergence point and a remote network infrastructure device controller, the re-convergence point can authenticate the host with the preemptively stored authentication information for the host. Furthermore, the automated distribution of policies to re-convergence points facilitates quick application of policies while minimizing consumption of local resources, such as policy engines or Ternary Content Addressable Memory (TCAM).

The network infrastructure device controller and network infrastructure devices may be provided in a Software Defined Networking (SDN) architecture. SDN separates a control plane and a data plane. The control plane determines rules for routing packets and is implemented in software. The control plane may be provided in a central controller (e.g., the network infrastructure device controller) separate from network switches which may include the network infrastructure devices. The data plane forwards the packets and is located at the switches. The SDN architecture allows a network administrator to manage and program switches through the central controller. Currently, a popular SDN standard for an SDN network is OPENFLOW. OPENFLOW is an open standard maintained by the Open Networking Foundation. OPENFLOW enables a controller in the control plane to control routing in the data plane through a forwarding instruction set. Examples described below are generally described with respect to an SDN architecture implementing an SDN standard such as OPENFLOW. However, the systems, functions and methods described below can be used in an SDN architecture that may use a standard other than OPENFLOW or may be used in other network architectures.

For the SDN architecture, the network infrastructure devices are programmable network infrastructure devices that can be programmed by the controller. A programmable network infrastructure device does not operate independently in a distributed fashion, but instead receives instructions from the controller.

FIG. 1 illustrates an example of network 100, which may include one or multiple networks, such as multiple local area networks (LANs). The network 100 includes a network infrastructure device controller 130 connected to network infrastructure devices. The network infrastructure devices may include switches 101a-d and APs 102a-c. The network 100 may be an SDN network and the controller 130 includes the control plane of the SDN network. The network infrastructure devices may include programmable network infrastructure devices implementing the data plane in the SDN network. For example, the controller 130 can remotely program the switches 101a-d, which may include physical or virtual switches. For example, the controller 130 can send instructions that may include one or more actions to be performed by a switch in the data plane. The actions may be for a particular host or a particular flow or for one particular packet. A flow includes packets that have common attributes, such as common source and destination Internet Protocol (IP) addresses or MAC addresses, and other attributes which may be associated with any of layers 1-4 of the OSI model. An action may include an operation performed at the switch that for example forwards a packet to a port, floods the packet, or modifies the packet, such as decrementing a time to live field. The actions may be provided in policies sent to the switches 101a-d. The policies may also include conditions that are to be satisfied to implement the actions. The switches 101a-d may be layer 2 network switches. In other examples, the switches may be layer 2/3 or layer 3 switches. The APs 102a-c may or may not implement policies and perform authentication depending on the hardware and/or software capabilities of the APs 102a-c. If any of the APs 102a-c does not have the capability to authenticate or implement policies, then those functions may be performed by the corresponding switches connected to the APs 102a-c. Also, the APs 102a-c may support the SDN architecture. For example, the controller 130 may manage the APs 102a-c as programmable network infrastructure devices in the data plane if the APs 102a-c support such capability. Also, an AP of the APs 102a-c may be incorporated in a switch as a single device or provided as a separate device. The APs 102a-c provide the hosts with access to the network.

The controller 130 for example is a remote controller that runs on a computer separate from other computers and network infrastructure devices in the network. For example, the controller 130 runs on its own server. In one example, the switches 101a-d and/or the APs 102a-c are OPENFLOW programmable devices in the data plane and the controller 130 is an OPENFLOW controller, and they operate according to the OPENFLOW standard.

Hosts 103-108 can connect to the network 100 via network infrastructure devices as shown in FIG. 1. The hosts may include personal computers, mobile devices, servers, etc. The number of network infrastructure devices and hosts shown in FIG. 1 is illustrated by way of example. Also, the network 100 may include wireless and/or wired networks. For example, the APs 102a-c and the switches 101a-b are provided in a wireless local area network. The switches 101c-d may be provided in a wired local area network. For example, switches 101c-d may be used to connect hosts 107 and 108 to a wired network in a data center.

The controller 130 may manage and program network infrastructure devices in the data plane. For example, the controller 130 may send policies to the switches 101a-d for controlling network traffic. According to an example, the controller 130 determines convergence points and re-convergence points for the hosts 103-108 and preemptively sends authentication information and policies for the hosts to the re-convergence points. The re-convergence points may use the authentication information and policies to authenticate the hosts and control the network traffic for the hosts if the hosts connect to the re-convergence points to access the network 100.

In an example, assuming the host 104 is not roaming but is connected to a convergence point, the controller 130 stores and distributes the policy and authentication information that are specific to the host 104 to the re-convergence points determined for the current convergence point of the host 104. FIG. 1 shows an example of the host 104 connected to a wireless local area network (WLAN) via AP 102b. The AP 102b is included in the convergence point for the host 104. The controller 130 determines the AP 102b or the AP 102b and the switch 101a (depending on the capabilities of the AP 102b to authenticate and/or implement policies) is the convergence point for the host 104 for example from monitoring of radio information for the AP 102b. The controller 130 determines that the AP 102c, which is in the same WLAN (and maybe in the same virtual local area network (VLAN)) as the AP 102b is the re-convergence point for the host 104 or that the AP 102c and the switch 101b are the re-convergence point. The controller 130 sends the authentication information and the policies for the host 104 to the re-convergence point. The controller 130 may determine multiple re-convergence points for a current convergence point. For example, the controller 130 does not know where the host will roam, so multiple re-convergence points are determined to account for different locations where the host may roam from its current ingress point. The examples of the present disclosure described herein are applicable to determining multiple re-convergence points for a current convergence point of the host and staging the authentication and policy information for the host at the multiple re-convergence points. Also, the determination of re-convergence points and the staging of authentication information and policy for a host are repeated each time a host is connected to the network at a new convergence point.

Assume a network event happens. For example, the host 104 roams to a new geographic location and connects to the WLAN via the re-convergence point which includes the AP 102c. The AP 102c and/or the switch 101b detect that the host 104 is connecting to the AP 102c and triggers AP 102c and/or the switch 101b to authenticate the host 104 using the authentication information previously sent by the controller 130 and to implement the host's policy previously sent by the controller 130. These operations are described in further detail below.

Figure 2:
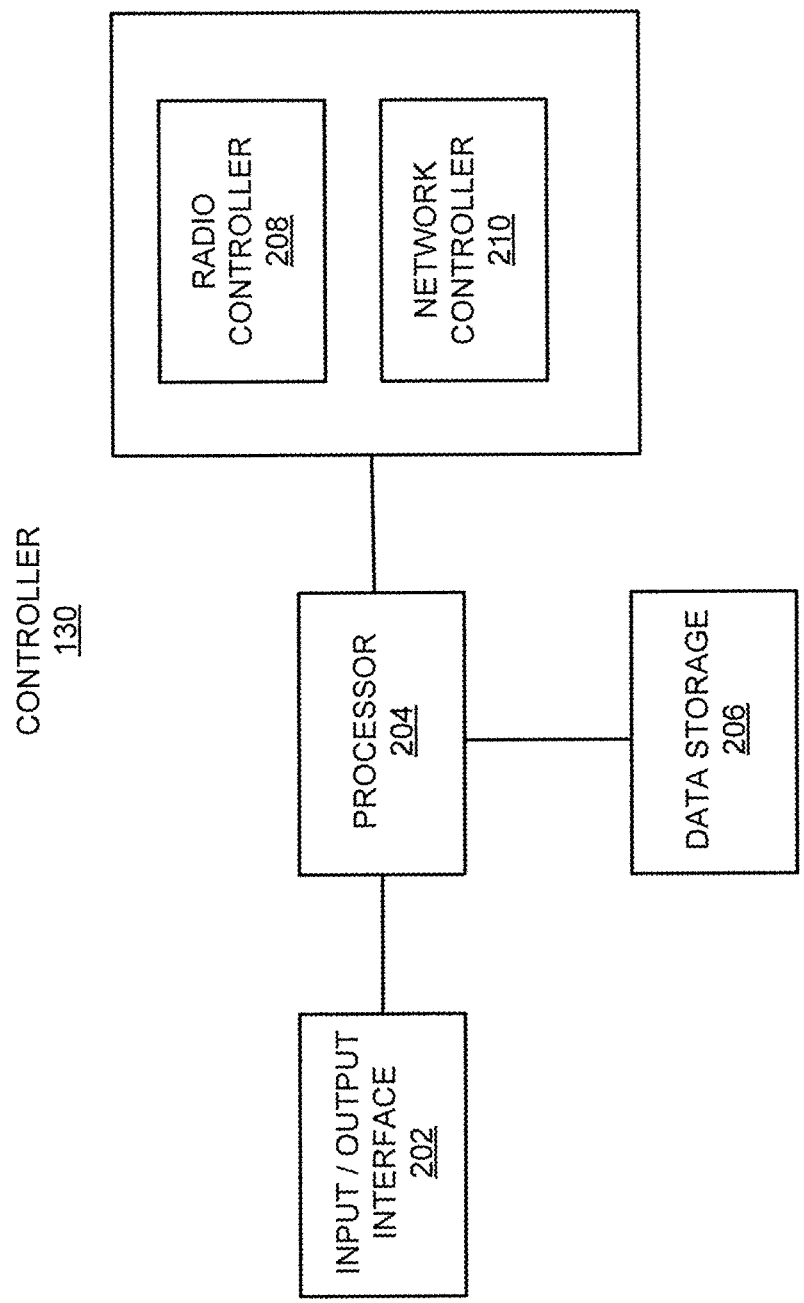
FIG. 2 shows a block diagram of a controller, according to an example of the present disclosure.
Figure 3:
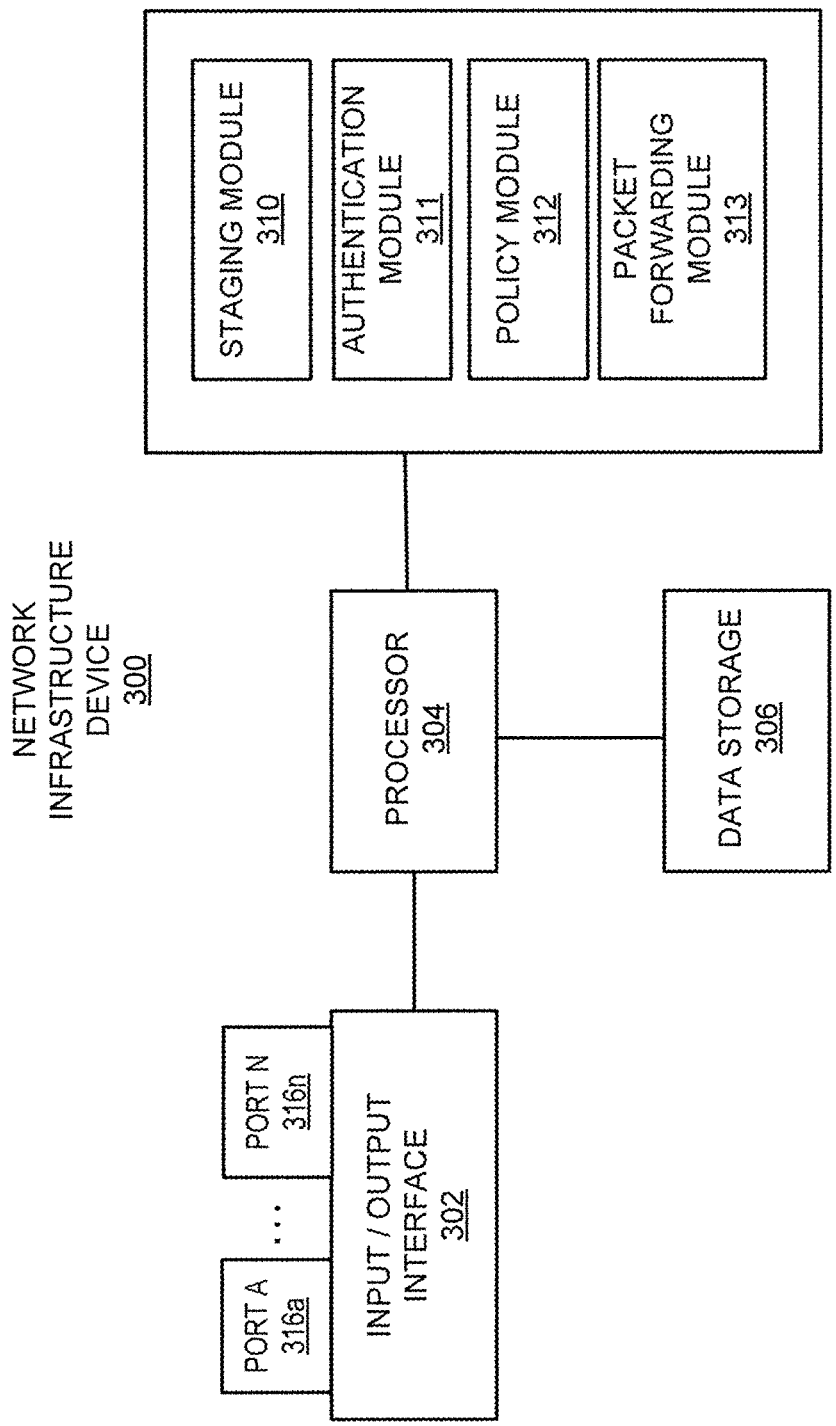
FIG. 3 shows a block diagram of a network infrastructure device, according to an example of the present disclosure.

FIGS. 2 and 3 show block diagrams of the controller 130 and a network infrastructure device respectively according to examples. As shown in FIG. 2, the controller 130 may include an input/output interface 202, a processor 204, a data storage 206, a radio controller 208 and network controller 210. The processor 204 may include a microprocessor operable to execute machine readable instructions to perform programmed functions and/or hardware dedicated to perform one or more particular functions, such as an application specific integrated circuit (ASIC), field-programmable gate array (FPGA), or other customized integrated circuit.

The radio controller 208 and the network controller 210 may be executed by the processor 204. For example, the radio controller 208 and the network controller 210 may include hardware customized to perform the functions of the controllers and/or may include machine readable instructions stored on a non-transitory computer readable medium, such as volatile or non-volatile memory or other type of data storage, and executed by the processor 204 to perform the functions of the modules. Also, the radio controller 208 and the network controller 210 may be provided on the same computer or on different computers.

The radio controller 208 manages wireless network infrastructure devices, such as APs 102a-c and switches 101a-b shown in FIG. 1. The radio controller 208 monitors connections of wireless network infrastructure devices and radio signal information, such as signal strength, of the connections. The radio controller 208 can identify a particular host connected to a particular AP and can determine APs that are in close proximity to the host-connected AP for example based on signal strength. A set of one or multiple close-proximity APs may be provided to the network controller 210 from the radio controller 208 to determine a re-convergence point or multiple re-convergence points for an AP. Close proximity of an AP may be based on whether an AP has adequate signal strength for creating a wireless connection at current location of the host.

The network controller 210 performs the functions of the control plane, such as managing forwarding tables of the network infrastructure devices, including the switches 101a-d. For example, the network controller 210 can send instructions that may include one or more actions to be performed by a switch in the data plane for a particular flow or for one particular packet. The network controller 210 can also send instructions to a switch for handling unmatched packets.

The network controller 210 also determines current convergence points for hosts, such as hosts 103-108 shown in FIG. 1, and stores, in the data storage 206, authentication information for the hosts and policies for controlling network traffic for the hosts. The authentication information for the hosts and policies for the hosts may be stored before the hosts initially connect to the network. The authentication information for a host may include a host ID (e.g., MAC address) and an indication of whether the host is authorized to connect to the network. A policy may include a condition and an action, and if a condition of a policy is satisfied as determined for example by a switch, then the action of the policy is performed by the switch. Examples of policies include rate limiting if network traffic is from a particular host or flow, or assigning traffic priorities to network traffic from a particular host or flow.

The network controller 210 also determines re-convergence points corresponding to the convergence points, associates stored authentication information and policies for hosts with their re-convergence points, and distributes the authentication information and the policies to the re-convergence points preemptively. These operations may be performed responsive to determining a convergence point in which a host is currently connected.

According to an example, a re-convergence point may be determined for a convergence point if it is in close proximity to the convergence point. In one example, a re-convergence point is determined based on information provided from the radio controller 208. For example, as shown in FIG. 1, host 104 is connected to AP 102b. Access point-network switch pairs in the network that have adequate signal strength for connecting the host to the network at a current location of the host are determined from signal strength information for APs 102b and 102c. For example, the current convergence point for the host 104 in FIG. 1 is AP 102b and switch 101a. The network controller 210 determines that an AP-switch pair including AP 102c and switch 101b is in close proximity to AP 102b from information provided from the radio controller 208. The network controller 208 stores the current conversion point of the host 104 and an indication of the re-convergence point including the AP 102c and switch 101b in the data storage 206. The network controller 208 also associates the authentication information and policy for the host 104 with the re-convergence point so the network controller 208 can send the authentication information and policy for the host 104 to the switch 101b. Accordingly, when the host 104 connects to AP 102c, the host 104 can be authenticated and the policy applied by the re-convergence point. In this example, the convergence point and re-convergence point are AP-switch pairs, but in other examples, the convergence point and re-convergence point may be an AP or a switch. Also, for AP-switch pairs, the re-convergence point may include a different switch than the convergence point. For example, if host 104 shown in FIG. 1 switches from AP 102b to AP 102b, the switch 101a may already have the authentication and policy information for the host 104 and thus the switch 101b does not need to re-authenticate the host 104 and already has the policy for the host 104. However, if the AP 102a is on a different virtual local area network (VLAN) and the policy for the host 104 is VLAN specific, then the re-convergence point may include the same switch, such as switch 101a because the switch 101a may not have the policy for the different VLAN. Furthermore, a host can be placed on the correct VLAN according to the policy after the host is authenticated.

In another example, re-convergence points may be determined through a link discovery protocol that can identify nodes within a close proximity. For example, Link Layer Discovery Protocol (LLDP) is a link layer protocol that may be used by network devices for advertising their identity, capabilities, and neighbors on an IEEE 802 LAN. A switch advertises itself to adjacent (neighbor) devices by transmitting LLDP data packets out all ports on which outbound LLDP is enabled, and reading LLDP advertisements from neighbor devices on ports that are inbound LLDP-enabled.

The neighbor information may be provided to the network controller 210 from the switches, and the network controller 210 may identify re-convergence points that are neighbor devices to a convergence point.

The input/output interface 202 may include a hardware and/or software interface that enables transmission and receipt of information in the network 100. The input/output interface 202 for example is a network interface. The controller 130 may send information to the network infrastructure devices and receive information from the network infrastructure devices via the input/output interface 202. For example, the controller 130 may send policy and authentication information to re-convergence points via the input/output interface 202.

The data storage 206 may include volatile and/or non-volatile data storage, such as random access memory, memristors, flash memory, and the like. Machine readable instructions, radio information obtained from wireless network infrastructure devices, link discovery information, policies, authentication information, and any information used by the controller 130 may be stored on the data storage 206. Other known electronic components may be added or substituted in the controller 130.

FIG. 3 shows a block diagram of a network infrastructure device 300. The network infrastructure device 300 may be a switch or an AP shown in FIG. 1 that may be included in a re-convergence point. The network infrastructure device 300 may be a programmable network infrastructure device that includes a data plane of an SDN network and is programmed by the network controller 130 with policies and packet forwarding rules.

As shown in FIG. 3, the network infrastructure device 300 may include a processor 304, an input/output interface 302, a data storage 306 and modules 310-313. The processor 304 may include a microprocessor operable to execute machine readable instructions to perform programmed functions and/or hardware dedicated to perform one or more particular functions, such as an application specific integrated circuit (ASIC), field-programmable gate array (FPGA), or other customized integrated circuit.

The data storage 306 may include volatile and/or non-volatile data storage, such as random access memory, memristors, flash memory, and the like. Machine readable instructions, tables for authentication, policies, and packet forwarding rules, and any information used by the network infrastructure device 300 may be stored on the data storage 206. Other known electronic components may be added or substituted in the network infrastructure device 300.

The input/output interface 302 may include hardware and/or software to enable the processor 304 to communicate with hosts and other network infrastructure devices through ports 316a-316n. The input/output interface 302 may include a network interface card. The ports 316a-316n may be Ethernet ports.

The modules of the network infrastructure device 300 may include a staging module 310, authentication module 311, policy module 312, and packet forwarding module 313. The modules 310-313 may be implemented by the processor 304 and may include hardware customized to perform the functions of the modules and/or may include machine readable instructions stored on a non-transitory computer readable medium, such as volatile or non-volatile memory or other type of data storage, and executed by the processor 304.

The staging module 310 receives authentication information and a policy from the controller 130 that facilitates the network infrastructure device 300 to operate as a re-convergence point for a host (e.g., the host 104 shown in FIG. 1) and stores the information in the data storage 306. The staging module 310 may trigger authentication of the host 104 and policy implementation for the host 104 if the host 104 is detected as connecting to the network infrastructure device 300. The authentication module 311 authenticates the host 104 using the stored authentication information and the policy module 312 facilitates the implementation of the policy for the host 104. The packet forwarding module 313 performs packet forwarding according to rules and policies which may be received from the controller 130.

According to an example, the network infrastructure device 300 may be programmed such that when a MAC learn event is detected, such as in response to receiving a message from an unknown host, then the network infrastructure device 300 determines whether the MAC of the unknown host was preemptively received from the controller 130 and stored in the data storage 306 as re-convergence point information for the unknown host. For example, the host 104 shown in FIG. 1 connects to the AP 102c, and the AP 102c or the switch 101b determines that they do not have packet forwarding for the MAC address of the host 104. If the MAC address of the host 104 is stored as re-convergence point information, then the MAC address of the host 104 may be populated in tables of the AP 102c or the switch 101b for packet forwarding along with the policy for the host 104.

Figure 4:
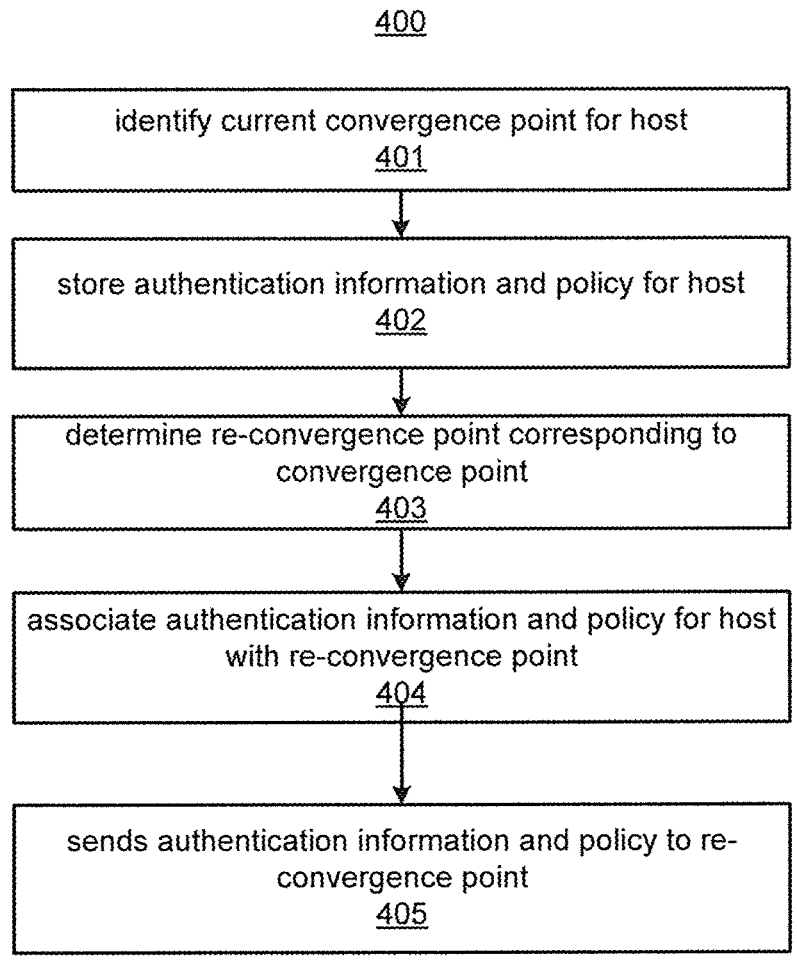
FIG. 4 depicts a flow diagram of a method that may be implemented by the controller, according to an example of the present disclosure.
Figure 5:
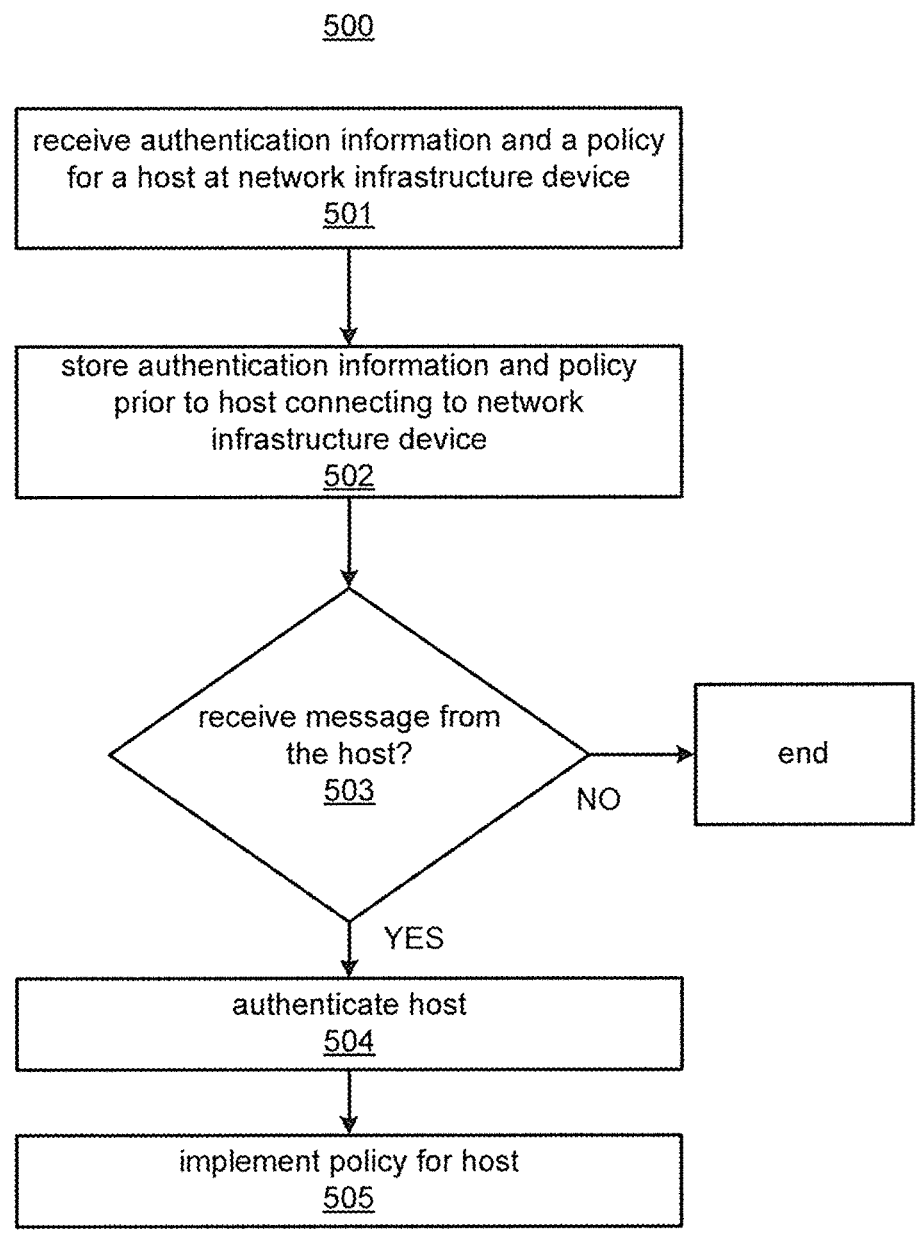
FIG. 5 depicts a flow diagram of a method that may be implemented by the network infrastructure device, according to an example of the present disclosure.

FIGS. 4 and 5 depict flow diagrams of methods 400 and 500. It should be apparent to those of ordinary skill in the art that the methods 400 and 500 represent generalized illustrations and that other operations may be added or existing operations may be removed, modified, or rearranged without departing from the scopes of the methods 400 and 500. Also, the methods 400 and 500 may be performed by hardware such as the processors 204 and 304 shown in FIGS. 2 and 3. Also, the methods 400 and 500 may be repeated each time the host is connected to the network at a new convergence point.

FIG. 4 shows a method 400 for distributing information to a re-convergence point according to an example. The method 400 may be executed by the controller 130 shown in FIGS. 1 and 2 and is described by way of example as being performed by the controller 130. At 401, the controller 130 identifies a current convergence point connecting a host to a network. For example, the controller 130 may receive a message from a network infrastructure device, such as the switch 101a shown in FIG. 1, indicating that a host, such as host 104, is connected to it.

At 402, the controller 130 stores authentication information and a policy for the host 104. At 403, the controller 130 determines a re-convergence point corresponding to the convergence point. For example, the controller 130 determines a re-convergence point for the convergence point. For example, the host 104 is currently connected to the AP 102b, and the controller 130 determines the AP 102c-switch 101b pair is the re-convergence point. For example, from radio information determined by the radio controller 208 shown in FIG. 2 or from neighbors determined through a discovery protocol, the controller 130 identifies the re-convergence point for the convergence point.

At 404, the controller 130 associates the authentication information and the policy for the host 104 with the re-convergence point and at 405 sends the authentication information and the policy to the re-convergence point. For example, the authentication information and the policy for the host 104 is transmitted from the controller 130 to the switch 101b shown in FIG. 1. One or more of the operations of the method 400 may be performed preemptively, such as prior to the host 104 connecting to the AP 102c shown in FIG. 1 or at any time when the re-convergence point can be determined for the current convergence point of the host 104. At 403-405, the controller 130 may determine multiple re-convergence points corresponding to the convergence point, and send the authentication and policy information for the host to the multiple re-convergence points.

FIG. 5 shows a method 500 for staging authentication information and a policy at a network infrastructure device, such as the network infrastructure device 300 shown in FIG. 3, and the method 500 is described by way of example as performed by the network infrastructure device 300. In the method 500, the network infrastructure device 300 was determined by the controller 130 to be a re-convergence point for a host, such as the host 104 shown in FIG. 1, prior to the execution of the method 500. If multiple re-convergence points are determined, then the staging of the authentication information and the policy is performed for each re-convergence point. At 501, the network infrastructure device 300 receives, from the controller 130, authentication information and a policy for the host 104 currently connected to the network 100 via a convergence point (e.g., AP 102b-switch 101a).

At 502, the network infrastructure device 300 stores the authentication information and the policy prior to the host 104 connecting to the network infrastructure device 300.

At 503, the network infrastructure device 300 determines whether it receives a message from the host 104. For example, the network infrastructure device 300 may receive a message, determines it is from an unknown host, and then determines whether the source MAC address of the message is the MAC address of the host 104, which may have been previously transmitted to the network infrastructure device 300 from the controller 130 along with the authentication information and policy for the host 104 such as described at 405 in the method 400.

If the message is from the host 104, the authentication of the host 104 is triggered at 504 using the authentication information received from the controller 130. At 505, the policy previously sent from the controller 130 for the host 104 is implemented by the network infrastructure device 300. If at 503, it is determined that the message is not from the host the method 500 ends. However, if at 503, it is determined that the message is not from the host, operations 503-505 may be repeated for messages subsequently received from unknown hosts to keep checking of the host 104 is connecting to its re-convergence point as long as the network infrastructure device 300 remains the re-convergence point for the host 104. For example, if the host 104 disconnects from the network for a predetermined period of time or if the host 104 subsequently reconnects to the network via another convergence point, the network infrastructure device 300 may not be a re-convergence point anymore.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A network infrastructure device controller comprising:
a data storage configured to store information for a convergence point in a network, and at least one re-convergence point of a plurality of re-convergence points in the network, the convergence point comprising a first network infrastructure device capable of connecting a host to the network, and each of the plurality of the re-convergence points comprising a second network infrastructure device capable of re-connecting the host to the network;
a processor configured to
identify the convergence point connecting the host to the network;
store, in the data storage, authentication information to authenticate the host to assist in connecting the host to the network and a network traffic policy for controlling network traffic for the host, the authentication information and the network traffic policy being specific to the host;
determine, in response to connecting the host to the network at the convergence point, a particular re-convergence point of the plurality of re-convergence points in the network for the convergence point, the particular re-convergence point being within a predetermined number of hops of the convergence point, wherein the particular re-convergence point is configured to re-connect the host to the network using the authentication information, and configured to control network traffic for the host according to the network traffic policy; and
distribute the authentication information and the network traffic policy to a switch or access point of the particular re-convergence point, wherein the determining of the particular re-convergence point and the distributing of the authentication information and the network traffic policy to the switch or access point are performed prior to connecting the host to the re-convergence point to re-connect the host to the network, wherein the switch or access point is configured to implement the network traffic policy distributed by the network infrastructure device controller to control network traffic for the host.

2. The network infrastructure device controller of claim 1, comprising:
a radio controller to determine access point-network switch pairs in the network that have adequate signal strength for connecting the host to the network at a current geographic location of the host, wherein the convergence point and the re-convergence point include the access point-network switch pairs.

3. The network infrastructure device controller of claim 2, comprising:
a network controller to receive the access point-network switch pairs from the radio controller and store the authentication information and the network traffic policy information for the convergence point and the re-convergence point in the data storage.

4. The network infrastructure device controller of claim 1, wherein the processor is configured to receive information identifying adjacent neighbors in the network based on a discovery protocol, and determine the convergence point and the re-convergence point from the adjacent neighbors.

5. The network infrastructure device controller of claim 1, comprising:
a control plane to determine network traffic policies, including the network traffic policy for the convergence point and the re-convergence point, for programmable infrastructure devices implementing a data plane in the network, wherein the programmable infrastructure devices include the convergence point and the re-convergence point, and the programmable infrastructure devices are to receive the network traffic policies via the network from the control plane and administer the network traffic policies.

6. The network infrastructure device controller of claim 1, wherein the switch or access point is configured to authenticate the host with the authentication information when the host connects to the re-convergence point without exchanging messages between the switch or access point and the network infrastructure device controller.

7. The network infrastructure device controller of claim 1, wherein the network infrastructure device controller determines the re-convergence point for the convergence point based upon signal strength of a connection between the host and the re-convergence point.

8. The network infrastructure device controller of claim 1, comprising:
a radio controller to monitor signal strength of a connection between the host and an access point, wherein the determining of the re-convergence point for the convergence point is based on the signal strength.

9. The network infrastructure device controller of claim 1, wherein the network infrastructure device controller determines the re-convergence point for the convergence point through a link layer discovery protocol.

10. A network infrastructure device operating as a re-convergence point, the network infrastructure device comprising:
ports to send and receive data in a network;
a data storage to store information for packet forwarding; and
a processor to
receive, from a network controller in the network, authentication information and a network traffic policy for a host currently connected to the network via another network infrastructure device, the authentication information and the network traffic policy for the host being transmitted from the network controller to the network infrastructure device in response to the network controller determining the network infrastructure device is within a predetermined number of hops of the another network infrastructure device, wherein the network traffic policy is for controlling network traffic for the host;
store the authentication information and the network traffic policy in the data storage prior to the host connecting to the network infrastructure device;
determine that the host is connecting to the network infrastructure device;
authenticate the host with the authentication information; and
restrict packet forwarding actions on at least one of the ports for the host according to the network traffic policy received from the network controller.

11. The network infrastructure device of claim 10, wherein to determine whether the host is connecting to the network infrastructure device, the processor is configured to:
receive a message from the host;
determine whether the message is from an unknown host; and
in response to determining the message is from an unknown host, determine whether the stored authentication information and network traffic policy is for the unknown host.

12. The network infrastructure device of claim 11, wherein to authenticate the host and restrict the packet forwarding actions, the processor is configured to:
in response to determining the stored authentication information and network traffic policy is for the unknown host, authenticate the unknown host with the authentication information and restrict packet forwarding actions on the at least one port for the unknown host according to the network traffic policy.

13. The network infrastructure device of claim 12, wherein the authentication information and the network traffic policy are stored at the network infrastructure device prior to receiving the message from the host, and the processor is configured to store the network traffic policy in at least one table utilized for packet forwarding in response to authenticating the host.

14. The network infrastructure device of claim 12, wherein the processor is configured to authenticate the unknown host without exchanging messages with the network controller after receiving the message.

15. The network infrastructure device of claim 10, wherein the processor is configured to:
transmit an outbound advertisement, indicating at least one of an identity, capability, and neighboring network infrastructure devices of the network infrastructure device, through at least one outbound link layer discovery protocol (LLDP) enabled port;
read an inbound advertisement received through at least one inbound LLDP enabled port, the inbound advertisement comprising neighbor information indicating at least one of an identity, capability, and neighboring network infrastructure devices of a neighbor network infrastructure device; and
provide the neighbor information to the network controller, wherein the neighboring information indicates suitability of the neighbor network infrastructure device for serving as an additional re-convergence point.

16. A method comprising:
determining a current ingress point for a host to a network;
determining a plurality of re-convergence points for the current ingress point, wherein each of the plurality of re-convergence points, upon connection to the host, is configured to re-connect the host to the network, each of the plurality of re-convergence points being within a predetermined number of hops of the ingress point; and
transmitting authentication information for the host and a network traffic policy for the host to a switch or access point of each of the plurality of re-convergence points from a remote network controller via the network prior to the host connecting to at least one of the plurality of re-convergence points to access the network, wherein each of the switch or access points is configured to implement the transmitted network traffic policy to control network traffic for the host.

17. The method of claim 16, wherein determining the plurality of re-convergence points comprises:
determining access point-network switch pairs in the network that have adequate signal strength for connecting the host to the network at the current ingress point of the host, wherein the current ingress point and the plurality of re-convergence points include the access point-network switch pairs.

18. The method of claim 16, wherein determining the plurality of re-convergence points comprises:
receiving information identifying adjacent neighbors in the network based on a discovery protocol; and
determining the plurality of re-convergence points from the adjacent neighbors.

19. The method of claim 16, wherein the determining of the plurality re-convergence points comprises:
   determining a signal strength of a connection between the host and each of the re-convergence points, wherein the determination of the plurality re-convergence point is based upon the signal strength.

\* \* \* \* \*